US006910341B2

(12) United States Patent
Srichai et al.

(10) Patent No.: US 6,910,341 B2
(45) Date of Patent: Jun. 28, 2005

(54) TEMPERATURE CONTROL APPARATUS AND METHOD OF OPERATING THE SAME

(75) Inventors: Panaya Robert Srichai, Minneapolis, MN (US); William Francis Mohs, Minneapolis, MN (US); Bradley Michael Ludwig, Minnetonka, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/672,776

(22) Filed: Sep. 26, 2003

(65) Prior Publication Data

US 2005/0066671 A1   Mar. 31, 2005

(51) Int. Cl.$^7$ ............................ F25B 41/00; F25B 49/00
(52) U.S. Cl. ............................ 62/115; 62/174; 62/196.4
(58) Field of Search ....................... 62/159, 174, 196.4, 62/208, 209

(56) References Cited

U.S. PATENT DOCUMENTS

| | | | | |
|---|---|---|---|---|
| 3,248,895 A | * | 5/1966 | Mauer .......................... 62/157 |
| 3,978,685 A | | 9/1976 | Taylor .......................... 62/471 |
| 4,136,528 A | * | 1/1979 | Vogel et al. .................. 62/174 |
| 4,249,389 A | | 2/1981 | Mayer .......................... 62/192 |
| 4,303,090 A | | 12/1981 | Mayer .......................... 137/114 |
| 4,325,224 A | | 4/1982 | Howland .................... 62/192.2 |
| 4,327,558 A | | 5/1982 | Howland et al. ............. 62/160 |
| 4,353,221 A | | 10/1982 | Taylor .......................... 62/239 |
| 4,394,818 A | | 7/1983 | Brownfield et al. .......... 62/239 |
| 4,395,886 A | | 8/1983 | Mayer .......................... 62/160 |
| 4,419,866 A | | 12/1983 | Howland .................... 62/228.4 |
| 4,583,377 A | | 4/1986 | Viegas .......................... 62/503 |
| 4,586,875 A | | 5/1986 | Aman, Jr. .................... 417/228 |
| 4,646,529 A | | 3/1987 | Hanson ......................... 62/155 |
| 4,646,539 A | | 3/1987 | Taylor .......................... 62/278 |
| 4,706,468 A | | 11/1987 | Howland et al. ............. 62/199 |
| 4,711,095 A | | 12/1987 | Howland et al. ............. 62/117 |
| 4,712,383 A | | 12/1987 | Howland et al. ............. 62/200 |
| 4,720,980 A | | 1/1988 | Howland ........................ 62/81 |
| 4,735,055 A | | 4/1988 | Taylor et al. ................. 62/115 |
| 4,748,818 A | | 6/1988 | Satterness et al. ............ 62/160 |
| 4,890,459 A | | 1/1990 | Havemann .................... 62/126 |
| 4,896,512 A | | 1/1990 | Howland ....................... 62/117 |
| 4,899,549 A | | 2/1990 | Berge et al. ................... 62/160 |
| 4,903,495 A | | 2/1990 | Howland et al. .............. 62/81 |
| 4,912,933 A | | 4/1990 | Renken ......................... 62/81 |
| 4,920,756 A | | 5/1990 | Howland et al. ............. 62/173 |
| 4,932,219 A | | 6/1990 | Howland et al. ............. 62/174 |
| 4,934,390 A | | 6/1990 | Sapp ......................... 134/22.18 |
| 4,977,751 A | | 12/1990 | Hanson .......................... 62/81 |
| 4,977,752 A | | 12/1990 | Hanson ......................... 62/115 |

(Continued)

Primary Examiner—William E. Tapolcai
(74) Attorney, Agent, or Firm—Michael Best & Friedrich LLP (57) ABSTRACT

A temperature control unit and a method of operating a temperature control unit. The temperature control unit including a refrigeration circuit enclosing a refrigerant and having a compressor, a condenser, and an evaporator coil. The method including providing a first flow path extending through the compressor, the condenser, and the evaporator, providing a second flow path extending through the compressor and the evaporator, the second flow path bypassing a section of the refrigeration circuit, directing refrigerant through the first flow path during operation in a cooling mode, directing refrigerant through the second flow path during operation in a heating mode, and recovering refrigerant from the section of the refrigeration circuit during operation in a recovery cycle.

14 Claims, 4 Drawing Sheets

U.S. PATENT DOCUMENTS

| | | | |
|---|---|---|---|
| 5,056,324 A | 10/1991 | Haley | 62/115 |
| 5,065,587 A | 11/1991 | Howland et al. | 62/131 |
| 5,103,783 A | 4/1992 | Hanson et al. | 123/198 D |
| 5,107,686 A | 4/1992 | Howland | 62/160 |
| 5,123,251 A | 6/1992 | Hanson | 62/89 |
| 5,123,252 A | 6/1992 | Hanson | 62/89 |
| 5,123,253 A | 6/1992 | Hanson et al. | 62/89 |
| 5,123,263 A | 6/1992 | Gustafson | 62/511 |
| 5,129,235 A | 7/1992 | Renken et al. | 62/200 |
| 5,140,825 A | 8/1992 | Hanson et al. | 62/89 |
| 5,140,826 A | 8/1992 | Hanson et al. | 62/115 |
| 5,152,152 A | 10/1992 | Brickner et al. | 62/126 |
| 5,161,383 A | 11/1992 | Hanson et al. | 62/81 |
| 5,161,384 A | 11/1992 | Hanson et al. | 62/126 |
| 5,168,713 A | 12/1992 | Howland | 62/117 |
| 5,172,559 A | 12/1992 | Renken et al. | 62/81 |
| 5,172,560 A | 12/1992 | Jurewicz et al. | 62/89 |
| 5,172,561 A | 12/1992 | Hanson et al. | 62/127 |
| 5,197,670 A | 3/1993 | Hanson et al. | 236/78 D |
| 5,201,185 A | 4/1993 | Hanson et al. | 62/81 |
| 5,201,186 A | 4/1993 | Hanson | 62/126 |
| 5,222,368 A | 6/1993 | Hanson | 62/126 |
| 5,226,294 A | 7/1993 | Mayer | 62/323.1 |
| 5,233,842 A | 8/1993 | Manning et al. | 62/132 |
| 5,284,024 A | 2/1994 | Hanson et al. | 62/126 |
| 5,291,745 A | 3/1994 | Hanson | 62/89 |
| 5,303,560 A | 4/1994 | Hanson et al. | 62/126 |
| 5,355,692 A | 10/1994 | Brownfield | 62/212 |
| 5,377,493 A | 1/1995 | Friedland | 62/77 |
| 5,415,006 A | 5/1995 | Renken et al. | 62/196.4 |
| 5,423,190 A | 6/1995 | Friedland | 62/149 |
| 5,454,229 A | 10/1995 | Hanson et al. | 62/126 |
| 5,557,938 A | 9/1996 | Hanson et al. | 62/126 |
| 5,579,648 A | 12/1996 | Hanson et al. | 62/126 |
| 5,634,347 A | 6/1997 | Hanson et al. | 62/120 |
| 5,669,223 A | 9/1997 | Haley et al. | 62/160 |
| 5,778,690 A | 7/1998 | Hanson et al. | 62/160 |
| 5,996,360 A * | 12/1999 | Tanaka et al. | 62/160 |
| 6,367,269 B1 | 4/2002 | Hanson et al. | 62/162 |
| 6,560,978 B2 | 5/2003 | Renken et al. | 62/132 |
| 6,584,785 B1 * | 7/2003 | Karl | 62/117 |
| 6,609,388 B1 | 8/2003 | Hanson | 62/151 |

* cited by examiner

FIG. 3B

TEMPERATURE CONTROL APPARATUS AND METHOD OF OPERATING THE SAME

FIELD OF THE INVENTION

The invention relates to a temperature control apparatus, and more particularly to transport temperature control apparatuses and a method of operating the same.

BACKGROUND OF THE INVENTION

Trucks and tractor-trailer combinations frequently transport cargo that must be maintained at a predetermined temperature during transportation. Vehicles that transport temperature sensitive cargo typically have one or more load spaces that are maintained at a set point temperature by a temperature control unit, having a compressor, a condenser, a flow control valve, an expansion valve, and an evaporator coil. Operation of the temperature control unit is generally controlled and monitored by an electronic controller.

Generally, temperature control units operate in cooling and heating modes, depending, at least in part, upon the temperature of the load space and the ambient temperature outside the air-conditioned space. When the temperature of the load space is above the set point temperature, the temperature control units operate in the cooling mode to pull down the temperature in the load space. During operation in the cooling mode, refrigerant is directed along a refrigerant circuit, which extends between the compressor, the flow control valve, the condenser, the expansion valve, and the evaporator coil. Load space air is then exposed to the relatively cool evaporator coil.

When the temperature of the load space is below the set point temperature, the temperature control units operate in a heating mode. During operation in the heating mode, relatively warm refrigerant is directed through a heating circuit, which extends from the compressor, the flow control valve, and the evaporator coil. Load space air is then exposed to the relatively warm evaporator coil.

Additionally, to minimize the formation of ice and/or frost on the evaporator coil and to ensure that the temperature control unit is operating in the most efficient manner, temperature control units periodically operate in a defrost mode. During operation in the defrost mode, relatively warm refrigerant is directed through the heating circuit to defrost the evaporator coil. Additionally, during operation in the defrost mode, interaction between the load space air and the heating circuit is limited.

SUMMARY OF THE INVENTION

The heating and defrosting capacity of a temperature control unit depends, at least in part, upon the mass of refrigerant being directed through the heating circuit. Therefore, it is desirable to ensure that a maximum mass of refrigerant is directed through the heating circuit during heating and defrost modes.

Refrigerant generally accumulates in low pressure and/or low temperature areas of temperature control units. During operation in the heating and defrost modes, refrigerant generally accumulates in the condenser and in other elements of the temperature control unit that are not connected to the heating circuit. This accumulation of refrigerant in the condenser and in other elements of the temperature control unit that are not connected to the heating circuit reduces the efficiency of the temperature control unit during operation in the heating and defrost modes.

To address these and other concerns, the present invention provides, among other things, a temperature control unit including a refrigeration circuit having a compressor, a condenser, an evaporator coil, and a valve, a first flow path extending through the compressor, the condenser, the evaporator, and the valve, and a second flow path extending through the compressor, the evaporator, and the valve. The second flow path bypasses a portion of the refrigeration circuit. The valve has a first orientation, in which refrigerant is directed along the first flow path, and a second orientation, in which refrigerant is directed along the second flow path. The temperature control unit also includes a controller in communication with the valve and operable to move the valve between the first orientation and the second orientation. The controller moves the valve toward the first orientation to remove refrigerant from the portion of the refrigeration circuit during operation in a recovery cycle.

The present invention also provides a method of operating a temperature control unit including a refrigeration circuit having a compressor, a condenser, and an evaporator coil. The method includes providing a first flow path extending through the compressor, the condenser, and the evaporator and providing a second flow path extending through the compressor and the evaporator. The second flow path bypasses a portion of the refrigeration circuit. The method also includes directing refrigerant through the first flow path during operation in a cooling mode, directing refrigerant through the second flow path during operation in a heating mode, and recovering refrigerant from the portion of the refrigeration circuit during operation in a recovery cycle.

In addition, the present invention provides a method of operating a temperature control unit defining an air inlet and an air outlet and including a refrigeration circuit having a compressor, a condenser, and an evaporator coil positioned between the air inlet and the air outlet. The method includes providing an efficiency range, providing a first flow path extending through the compressor, the condenser, and the evaporator, and providing a second flow path extending through the compressor and the evaporator. The second flow path bypasses a portion of the refrigeration circuit. The method also includes measuring an air inlet temperature, measuring an air outlet temperature, calculating a temperature change between the air inlet temperature and the air outlet temperature, and initiating a recovery cycle when the temperature change is outside the efficiency range. The recovery cycle removes substantially all of the refrigerant from the portion of the refrigeration circuit.

Also, the present invention provides a method of operating a temperature control unit including a refrigeration circuit having a compressor, a condenser, and an evaporator coil. The method includes providing a first flow path extending through the compressor, the condenser, and the evaporator and providing a second flow path extending through the compressor and the evaporator. The second flow path bypasses a portion of the refrigeration circuit. The method also includes directing refrigerant through the first flow path during operation in a cooling mode, directing refrigerant through the second flow path during operation in a heating mode, and interrupting the heating mode and removing refrigerant from the portion of the refrigeration circuit.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show at least one construction of the present invention. However, it should be noted that the invention is explained and illustrated by way of example only. The various elements and combinations of elements described below and illustrated in the drawings can be arranged and organized differently to result in constructions which are still within the spirit and scope of the present invention. Also, it is understood that the phraseology and terminology used herein is for the purpose of description and should not be regarded as limiting.

In the drawings, wherein like reference numerals indicate like parts.

DETAILED DESCRIPTION

Figure 1:
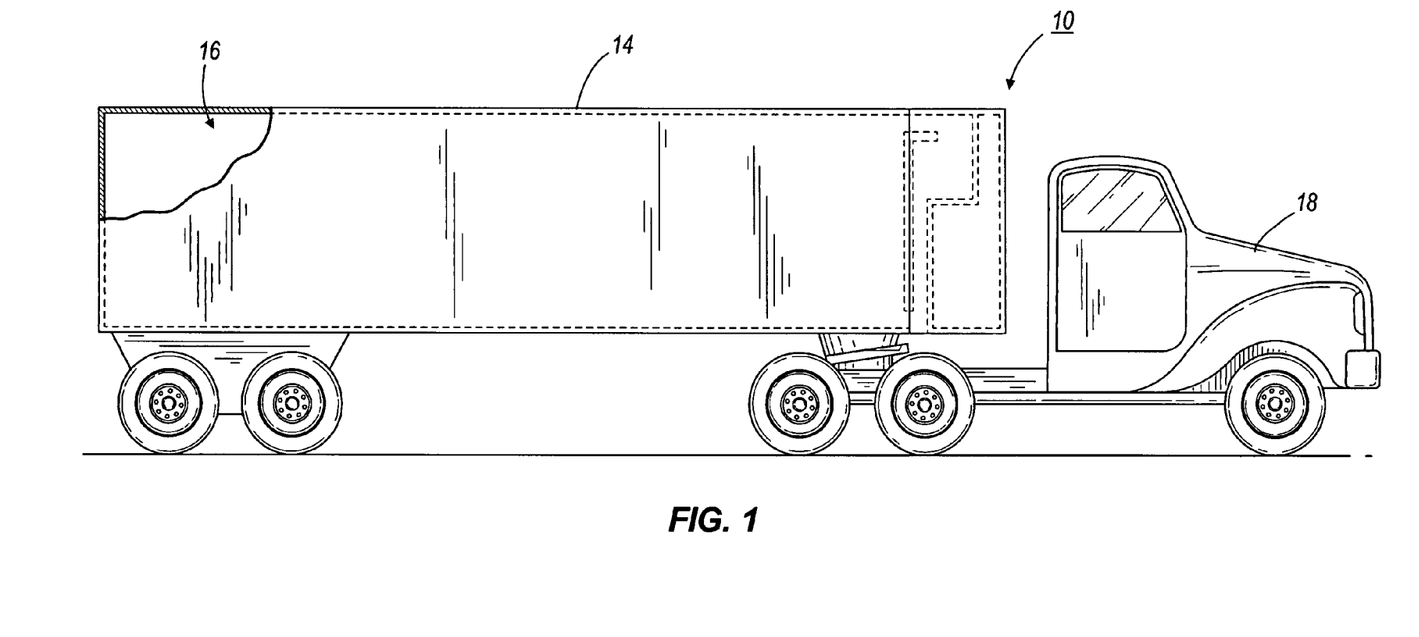
FIG. 1 is a side view, partially in section, of a vehicle having a temperature control unit embodying aspects of the present invention.

FIG. 1 illustrates a temperature control unit 10 in accordance with the present invention. The temperature control unit 10 is especially suitable for use in transport applications and can be mounted on a container, truck, or trailer. FIG. 1 shows the temperature control unit 10 mounted on a trailer 14 having a load space 16. The trailer 14 is pulled by a tractor 18, as is understood by those skilled in the art. In other constructions (not shown), the temperature control unit 10 can be mounted on a storage container or another vehicle, such as, for example, a tractor-trailer combination.

As used herein and in the claims, the term "load space" includes any space to be temperature and/or humidity controlled, including transport and stationary applications for the preservation of food, beverages, plants, flowers, and other perishables and maintenance of a proper atmosphere for the shipment of industrial products. Also, as used herein and in the claims, the term "refrigerant" includes any conventional refrigeration fluid, such as, for example, chloroflourocarbons (CFCs), hydrocarbons, cryogens (e.g., $CO_2$, and $N_2$), etc. In addition, as used herein and in the claims, the term "refrigerant" refers to fluids commonly used for heating and defrosting purposes.

Figure 2:
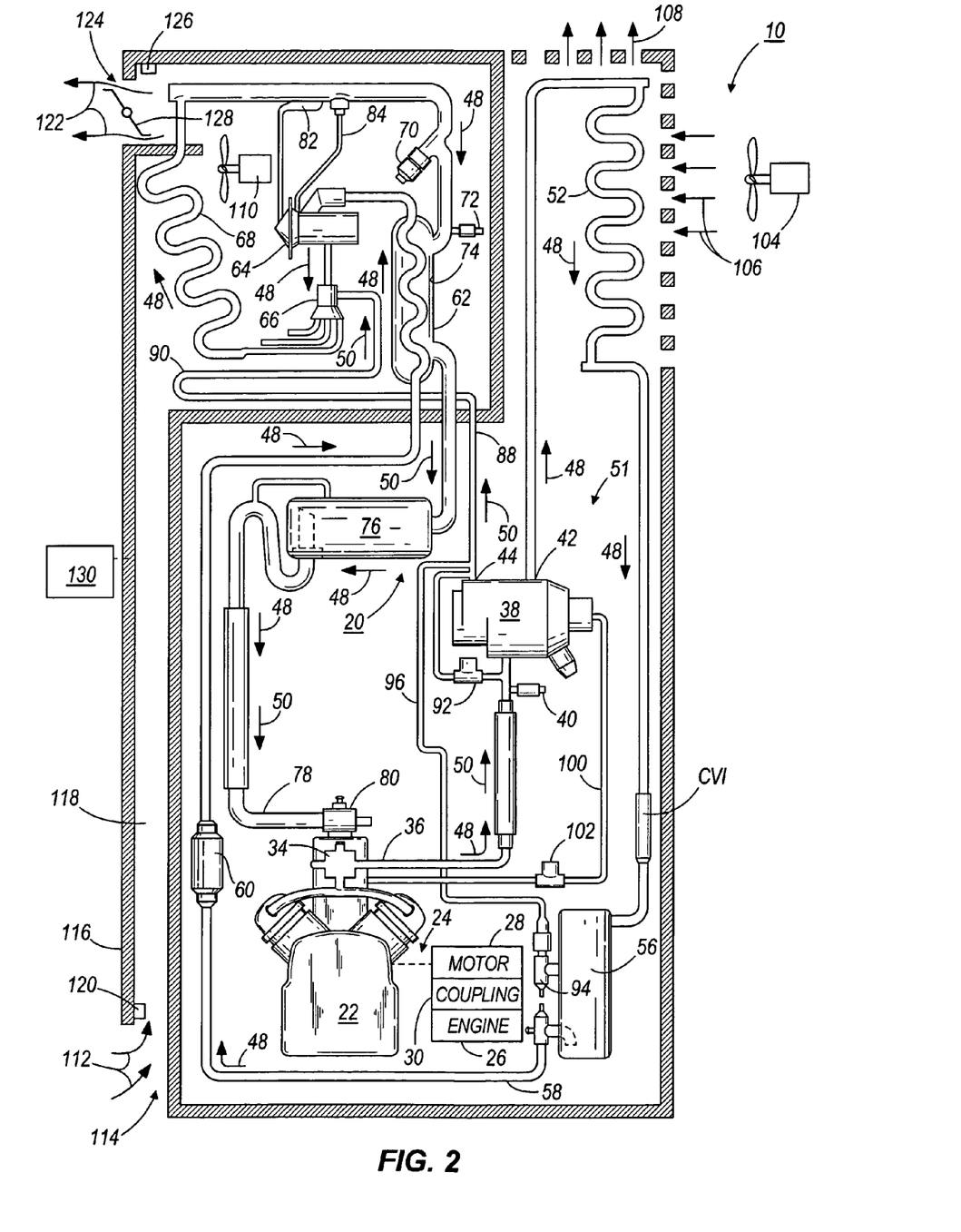
FIG. 2 is a schematic representation of the temperature control unit shown in FIG. 1.

The temperature control unit 10 controls the temperature of the load space 16 to a specified temperature range adjacent to a predetermined set point temperature ("SP"). More particularly, the temperature control unit 10 maintains the temperature of the load space 16 within a range surrounding the set point temperature SP (e.g., SP±5° F.). As shown in FIG. 2, the temperature control unit 10 has a closed refrigerant circuit or flow path 20, which includes a refrigerant compressor 22 driven by a prime mover arrangement 24. In the illustrated construction, the prime mover arrangement 24 includes an internal-combustion engine 26 and a stand-by electric motor 28. The engine 26 and the motor 28, when both are utilized, are connected to the compressor 22 by a clutch or coupling 30 which disengages the engine 26 while the motor 28 is in operation.

A discharge valve 34 and a discharge line 36 connect the compressor 22 to a three-way valve 38. A discharge pressure transducer 40 is located along the discharge line 36, upstream from the three-way valve 38 to measure the discharge pressure of the compressed refrigerant. The three-way valve 38 includes a first outlet port 42 and a second outlet port 44. When the temperature control unit 10 is operated in a COOLING mode, the three-way valve 38 is adjusted to direct refrigerant from the compressor 22 through the first outlet port 42 and along a first circuit or flow path (represented by arrows 48). When the temperature control unit 10 is operated in HEATING and DEFROST modes, the three-way valve 28 is adjusted to direct refrigerant through the second outlet port 44 and along a second circuit or flow path (represented by arrows 50).

The first flow path 48 extends from the compressor 22 through the first outlet port 42 of the three-way valve 38, a condenser coil 52, a one-way condenser check valve CV1, a receiver 56, a liquid line 58, a refrigerant drier 60, a heat exchanger 62, an expansion valve 64, a refrigerant distributor 66, an evaporator coil 68, an electronic throttling valve 70, a suction pressure transducer 72, a second path 74 through the heat exchanger 62, an accumulator 76, a suction line 78, and back to the compressor 22 through a suction port 80. The expansion valve 64 is controlled by a thermal bulb 82 and an equalizer line 84.

The second flow path 50 bypasses a section of the refrigeration circuit 51, including the condenser coil 52 and the expansion valve 64, and connects the hot gas output of compressor 22 to the refrigerant distributor 66 via a hot gas line 88 and a defrost pan heater 90. The second flow path 50 continues from the refrigerant distributor 66 through the evaporator coil 68, the throttling valve 70, the suction pressure transducer 72, the second path 74 through the heat exchanger 62, and the accumulator 76 and back to the compressor 22 via the suction line 78 and the suction port 80.

A hot gas bypass solenoid valve 92 is disposed to inject hot gas into the hot gas line 88 during operation in the COOLING mode. A bypass or pressurizing line 96 connects the hot gas line 88 to the receiver 56 via check valves 94 to force refrigerant from the receiver 56 into the second flow path 50 during operation in the HEATING and DEFROST modes.

Line 100 connects the three-way valve 38 to the low-pressure side of the compressor 22 via a normally closed pilot solenoid valve 102. When the solenoid valve 102 is closed, the three-way valve 38 is biased (e.g., spring biased) to select the first outlet port 42 of the three-way valve 38. When the evaporator coil 52 requires defrosting and when heating is required, valve 92 is energized and the low pressure side of the compressor 22 operates the three-way valve 38 to select the second outlet port 44 to begin operation in the HEATING mode and/or DEFROST modes.

A condenser fan or blower 104 directs ambient air (represented by arrows 106) across the condenser coil 52. Return air (represented by arrows 108) heated by contact with the condenser fan 104 is discharged to the atmosphere. An evaporator fan 110 draws load space air (represented by arrows 112) through an inlet 114 in a bulkhead or wall 116 and upwardly through conduit 118. A return air temperature sensor 120 measures the temperature ($T_1$) of air entering the inlet 114.

Discharge air (represented by arrow 122) is returned to the load space 14 via outlet 124. Discharge air temperature sensor 126 is positioned adjacent to the outlet 124 and measures the discharge air temperature ($T_2$). During the DEFROST mode and/or during operation in a RECOVERY cycle (described below), a damper 128 is moved from an opened position (shown in FIG. 2) toward a closed position (not shown) to close the discharge air path to the load space 14.

The temperature control unit 10 also includes a controller 130 (e.g., a microprocessor). The controller 130 receives data from sensors, including the return air temperature sensor 124 and the discharge air temperature sensor 126. Additionally, given temperature data and programmed parameters, the controller 130 determines whether cooling, heating, or defrosting is required by comparing the data collected by the sensors with the set point temperature SP.

Figure 3A:
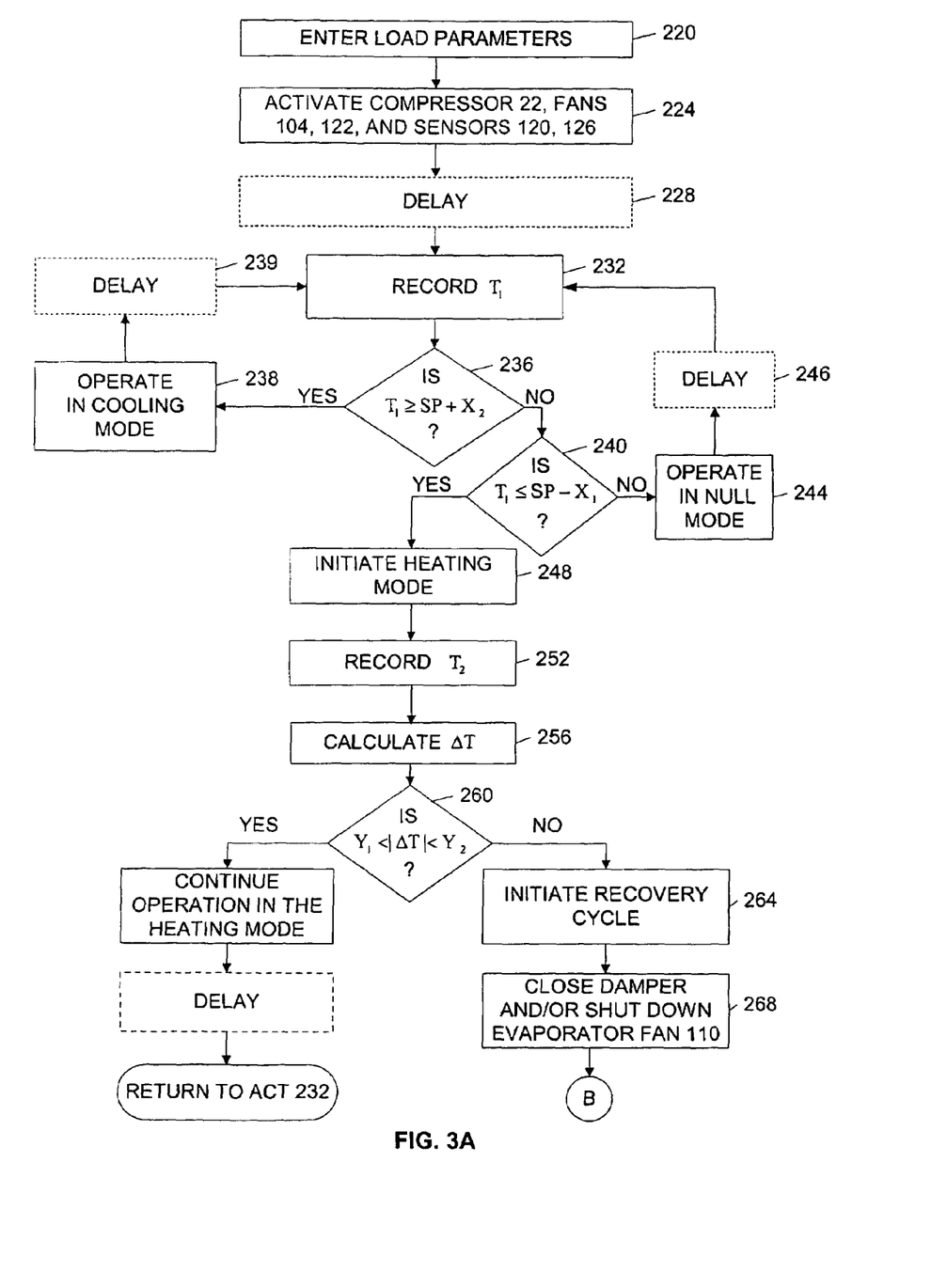
FIGS. 3A and 3B are flowcharts illustrating a method of monitoring and controlling the operation of the temperature control unit shown in FIG. 1.
Figure 3B:
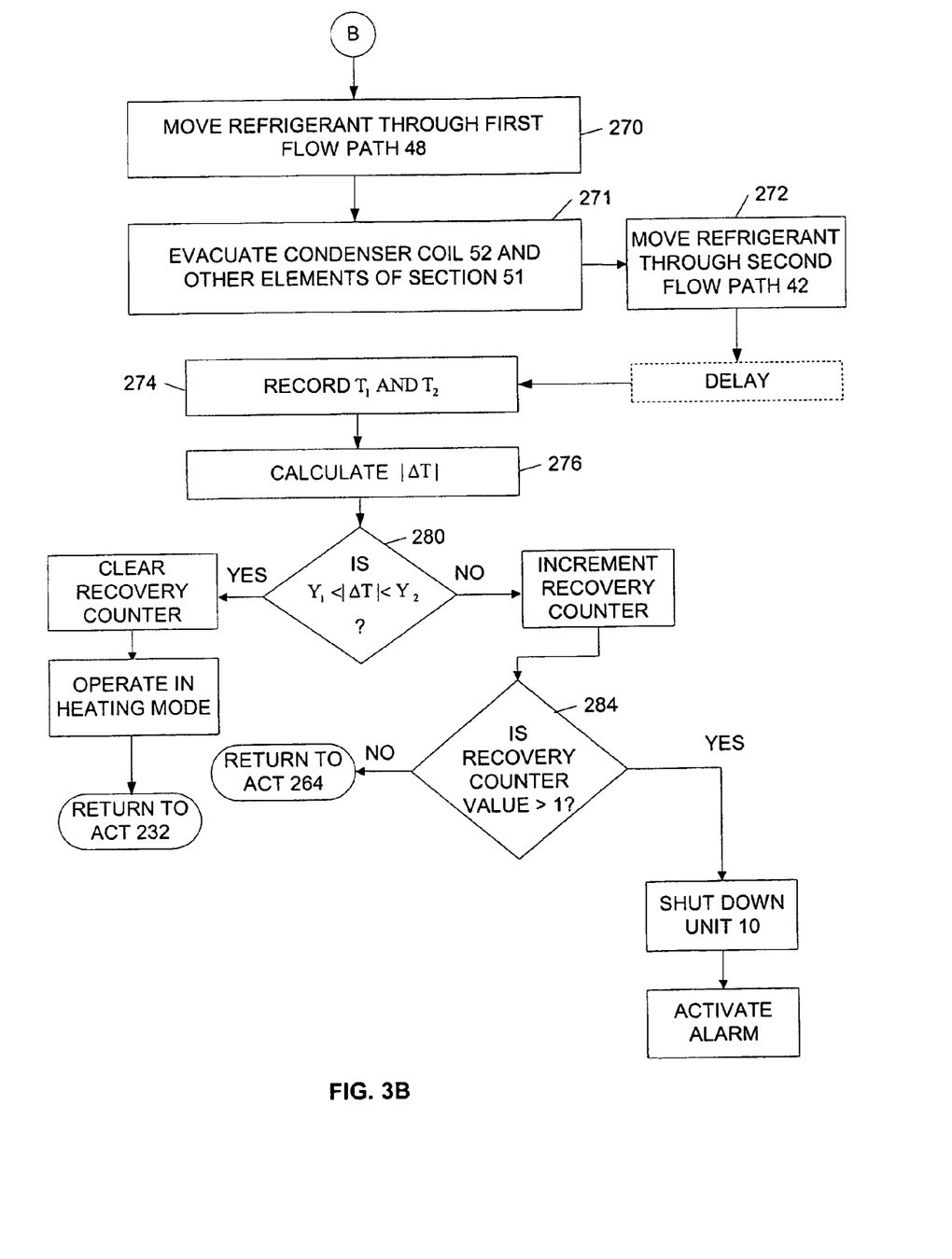

FIGS. 3A and 3B illustrate a method of monitoring and controlling operation of the temperature control unit 10. More particularly, FIGS. 3A and 3B outline an algorithm in the form of a computer program that can be used to practice the present invention.

Each time the temperature control unit 10 is switched on (i.e., booted-up), the controller 130 initiates a startup routine. Among other things, the startup routine determines if the temperature control unit 10 is operating correctly and searches for errors in the controller's programming and mechanical failures in the temperature control unit 10.

In act 220, the controller 130 prompts the operator to enter load parameters. In some constructions, the controller 130 prompts the operator to enter the set point temperature SP (e.g., 32° F.), a low temperature limit $X_1$ (e.g., °5 F), and a high temperature limit $X_2$ (e.g., °5 F). In other constructions, the controller 130 prompts the operator to enter the type of load (e.g., lettuce, bananas, flowers, ice cream, milk, etc.) and the anticipated travel time (e.g., one hour, two hours, etc.). In these constructions, the controller 130 recalls previously programmed set point temperature SP, low temperature limit $X_1$, and high temperature limit $X_2$ values for the selected load type.

In act 224, the controller 130 initiates temperature control operations. More particularly, the controller 130 activates the compressor 22, the condenser fan 104, the evaporator fan 110, the return air temperature sensor 120, and the discharge air temperature sensor 126. In act 228, the controller 130 initiates a delay (e.g., twenty seconds). In constructions having a delay, the delay accommodates variations in sensor readings and provides time during which the values recorded by the sensors can be stabilized.

In act 232, the return air temperature sensor 120 records the temperature $T_1$ of air entering the temperature control unit 10 through inlet 114 and transmits the return air temperature data $T_1$ to the controller 130. In general, the return air temperature $T_1$ is substantially equal to the average temperature of the load space air.

In act 236, the controller 130 determines whether or not the return air temperature $T_1$ is greater than or equal to the sum of the set point temperature SP and the high temperature limit $X_2$. If the return air temperature $T_1$ is greater than or equal to the sum of the set point temperature SP and the high temperature limit $X_2$ ("YES" at act 236), the controller 130 operates the temperature control unit 10 in the COOLING mode in act 238. As explained above, during operation in the COOLING mode, refrigerant is directed along the first flow path 48. Additionally, the damper 128 is moved toward the opened position and the evaporator fan 110 is activated to draw load space air across the evaporator coil 68. Relatively cold refrigerant flows through the evaporator coil 52 during operation in the COOLING mode and the load space air is cooled by contact with the relatively cold evaporator coil 52 before being returned to the load space 16 via the outlet 124.

After a short delay (e.g., about two minutes) in act 239, the return air temperature sensor 120 again records the return air temperature $T_1$ to determine if additional cooling is necessary. The temperature control unit 10 will continue to operate in the COOLING mode until the return air temperature $T_1$ is less than the sum of the set point temperature SP and the high temperature limit $X_2$.

If the return air temperature $T_1$ is less than the sum of the set point temperature SP and the high temperature limit $X_2$ ("NO" at act 236), the controller 130 determines if the return air temperature $T_1$ is less than or equal to the set point temperature SP minus the low temperature limit $X_1$ (i.e., if the return air temperature $T_1$ is below the predetermined acceptable temperature for the load) in act 240. If the return air temperature $T_1$ is greater than the set point temperature SP minus the low temperature limit $X_1$ ("NO" at act 240), the controller 130 operates the temperature control unit 10 in a NULL mode in act 244.

In the NULL mode, the controller 130 shuts down the compressor 22 or operates the compressor 22 at reduced speed and reduced capacity. Additionally, the controller 130 shuts down or reduces the operating speed of the condenser and evaporator fans 104, 110. After a short delay (e.g., one minute) in act 246, the controller 130 returns to act 232 and re-calculates the return air temperature $T_1$.

If the return air temperature $T_1$ is less than the sum of the set point temperature SP and the high temperature limit $X_2$ ("NO" at act 236) and if the return air temperature $T_1$ is less than or equal to the set point temperature SP minus the low temperature limit $X_1$ ("YES" at act 240) (i.e., if the return air temperature $T_1$ is below the predetermined acceptable temperature range for the load), the controller 130 initiates the HEATING mode in act 248. As described above, during operation in the HEATING mode, refrigerant is directed along the second flow path 50, bypassing portions of the refrigeration circuit 20, including the condenser coil 52, the check valve CV1, and the receiver 56. Additionally, during operation in the HEATING mode, the damper 128 is moved toward the opened position, the evaporator fan 110 is operated, and the condenser fan 104 is shut down.

In act 252, the discharge air temperature sensor 126 records the discharge air temperature $T_2$. In act 256, the controller 130 calculates a change in temperature $\Delta T$ (i.e., the change in load space air temperature caused by interaction between the load space air and the evaporator coil 68) by subtracting the return air temperature $T_1$ from the discharge air temperature $T_2$.

In act 260, the controller 130 determines if the absolute value of the change in temperature $\Delta T$ is within an acceptable range. In particular, the controller 130 determines whether or not the absolute value of the change in temperature $\Delta T$ is greater than a low temperature limit $Y_1$ (e.g., 6° F.) and whether or not the absolute value of the air temperature change $\Delta T$ is less than a high temperature limit $Y_2$ (e.g., 4° F.). It has been determined that if the absolute value of the air temperature change $\Delta T$ is not within a specific range, the temperature control unit 10 is not operating efficiently. More particularly, the acceptable range $Y_1 < \Delta T < Y_2$ defines an acceptable efficiency range for the temperature control unit 10. The acceptable efficiency range is determined experimentally and is stored in the controller 130.

The acceptable efficiency range of the temperature control unit 10 is a function of a number of individual factors, including the efficiency of the compressor 22, the ambient temperature, and the type of refrigerant used. One of the most frequent causes of reduced temperature control unit efficiency is a reduction in refrigerant charge. A leak in the temperature control unit 10 causes a reduction in refrigerant charge. Alternatively or in addition, some of the refrigerant can become trapped in the refrigeration circuit 20, and therefore, can be unavailable for use during operation in one or more of the COOLING, HEATING, and DEFROST modes. More particularly, during operation in the COOLING and NULL modes, refrigerant migrates toward the section 51 of the refrigeration circuit 20 bypassed by the second flow path 50 because the condenser coil 52 is often the coolest portion of the refrigeration circuit 20. This is particularly true when the ambient temperature is lower than the load space temperature. When the temperature control unit 10 shifts to operation in the HEATING or DEFROST modes, the refrigerant in the section 51 of the refrigeration circuit 20 bypassed by the second flow path 50 is trapped. The trapped refrigerant is unavailable for use in the HEATING or DEFROST modes. In a similar manner, frequent shifting between operation in the COOLING mode and the HEATING or DEFROST modes can cause refrigerant to accumulate in the section 51 of the refrigeration circuit 20 that is bypassed by the second flow path 50.

If the absolute value of the air temperature change $\Delta T$ is within the acceptable range ("YES" at act 260), the temperature control unit 10 is operating efficiently and the controller 130 continues to operate the temperature control unit 10 in the HEATING mode. After a short delay (e.g., one minute), the controller returns to act 232.

If the absolute value of the air temperature change $\Delta T$ is not within the acceptable range ("NO" at act 260), the temperature control unit 10 is not operating efficiently and the controller 130 initiates a RECOVERY cycle in act 264. In addition, in act 268, the controller 130 moves the damper 128 to the closed position and/or shuts down the evaporator fan 110 to reduce heat transfer between the evaporator coil 68 and the load space air. The controller 130 also signals the three-way valve 38 to direct refrigerant out through the first outlet 42 and into the first flow path 48 in act 270. This causes a pressure increase in the section 51 of the refrigeration circuit 20 that is bypassed by the second flow path 50. The pressure increase causes refrigerant to flow out of the condenser coil 52 into the receiver 56 in act 271.

During operation in the RECOVERY cycle, it is desirable to remove as much refrigerant as possible from the section 51 of the refrigeration circuit 20 that is bypassed by the second flow path 50. However, it has been found that even after operation in the RECOVERY cycle a minimal amount of refrigerant may remain in the section 51 of the refrigeration circuit 20 that is bypassed by the second flow path 50. Accordingly, the RECOVERY cycle typically removes substantially all of the refrigerant from the section 51 of the refrigeration circuit 20 that is bypassed by the second flow path 50.

In act 272, the controller 130 signals the three-way valve 38 to begin directing refrigerant through the second outlet 44 and into the second flow path 50. After a short delay, the return air temperature sensor 120 measures the return air temperature $T_1$ and the discharge air temperature sensor 126 measures the discharge air temperature $T_2$ in act 274. The controller 130 then calculates the absolute value of the change in air temperature $\Delta T$ in act 276.

In act 280, the controller 130 determines whether or not the absolute value of the temperature change $\Delta T$ is within the predetermined efficiency range. If the absolute value of the temperature change $\Delta T$ is within the predetermined efficiency range ("YES" at act 280), a recovery counter is cleared and the temperature control unit 10 resumes operation in the HEATING mode. Alternatively, if the absolute value of the temperature change $\Delta T$ is not within the predetermined efficiency range ("NO" at act 280), the controller 130 increments the recovery counter. In act 284, the controller 130 determines whether or not the recovery counter value is greater than one.

If the controller 130 determines that the recovery counter value is less than one (i.e., that the controller 130 has not initiated the RECOVERY cycle two or more times consecutively) ("NO" at act 284), the controller 130 reinitiates the RECOVERY cycle. Alternatively, if the temperature control unit 10 determines that the recovery counter value is greater than one (i.e., that the controller 130 has initiated the RECOVERY cycle two or more times consecutively) ("YES" at act 284), it is likely that little or no refrigerant is trapped in the section 51 of the refrigeration circuit 20 that is bypassed by the second flow path 50. Rather, it is likely that the compressor 22 is not operating effectively and/or the temperature control unit 10 has a refrigerant leak. Accordingly, if the absolute value of the temperature change $\Delta T$ is not within the predetermined efficiency range and the temperature control unit 10 has been operated in the RECOVERY cycle at least two times consecutively, the controller 130 shuts down the compressor 22 and activates an alarm to alert the operator that the temperature control unit 10 is not operating properly.

The constructions described above and illustrated in the drawings are presented by way of example only and are not intended to limit the concepts and principles of the present invention. Although particular constructions of the present invention have been shown and described, other alternate constructions will be apparent to those skilled in the art and are within the intended scope of the present invention.

For example, the present invention is described herein as having a single three-way valve 38, which directs refrigerant flow through the refrigeration circuit 20 along the first and second flow paths 48, 50. However, one having ordinary skill in the art will appreciate that the present invention could also or alternatively include other flow directing valves and flow directing arrangements, such as for example, a Y-shaped conduit having a two-way valve located in each of the legs of the Y-shaped conduit.

Also, the present invention is described herein as including a return air temperature sensor 120 for recording a return air temperature $T_1$ and a discharge air temperature sensor 126 for recording a discharge air temperature $T_2$. Additionally, the controller 130 is described herein as controlling operation of the temperature control unit 10 and initiating operation in the RECOVERY cycle based, at least in part, upon the return air temperature $T_1$ and the discharge air temperature $T_2$. However, in alternate constructions (not shown), the suction pressure transducer 72 records a first pressure value and the discharge pressure transducer 40 records a second pressure value. In these constructions, the controller 130 controls operation of the temperature control unit 10 and initiates operation of the RECOVERY cycle based, at least in part, upon the absolute value of the difference between the first and second pressure values. In still other constructions, the controller 130 controls operation of the temperature control unit 10 based upon a combination of data received from the return air temperature sensor 120, the discharge air temperature sensor 126, the suction pressure transducer 72, and the discharge pressure transducer 40.

As such, it will be appreciated by one having ordinary skill in the art, that various changes in the elements and their configuration and arrangement are possible without departing from the spirit and scope of the present invention as set forth in the claims.

What is claimed is:

1. A method of operating a temperature control unit, the temperature control unit including a refrigeration circuit housing a refrigerant and having a compressor, a condenser, and an evaporator coil, the method comprising:
   providing a first flow path extending through the compressor, the condenser, and the evaporator:
   providing a second flow path extending through the compressor and the evaporator, the second flow path bypassing a section of the refrigeration circuit;
   directing refrigerant through the first flow path during operation in a cooling mode;
   directing refrigerant through the second flow path during operation in a heating mode; and
   recovering refrigerant from the section of the refrigeration circuit during operation in a recovery cycle;
   wherein the temperature control unit defines an air inlet and an air outlet and the method further comprises:
   providing an efficiency range;
   measuring an air inlet temperature;
   measuring an air outlet temperature;
   calculating a temperature change between the air inlet temperature and the air outlet temperature; and
   initiating the recovery cycle when the temperature change is outside the efficiency range.

2. The method of claim 1, wherein the section of the refrigeration circuit includes the condenser.

3. The method of claim 1, wherein the refrigeration circuit includes a receiver tank, and wherein recovering refrigerant from the section of the refrigeration circuit during operation in the recovery cycle includes directing refrigerant through the first flow path to increase pressure in the receiver tank.

4. The method of claim 1, wherein recovering refrigerant from the section of the refrigeration circuit during operation in the recovery cycle includes interrupting the flow of refrigerant through the second flow path and directing refrigerant through the first flow path.

5. A method of operating a temperature control unit, the temperature control unit defining an air inlet and an air outlet and including a refrigeration circuit enclosing a refrigerant and having a compressor, a condenser, and an evaporator coil positioned between the air inlet and the air outlet, the method comprising:
   providing an efficiency range;
   providing a first flow path extending through the compressor, the condenser, and the evaporator;
   providing a second flow path extending through the compressor and the evaporator, the second flow path bypassing a section of the refrigeration circuit;
   measuring an air inlet temperature;
   measuring an air outlet temperature;
   calculating a temperature change between the air inlet temperature and the air outlet temperature; and
   initiating a recovery cycle when the temperature change is outside the efficiency range, the recovery cycle removing substantially all of the refrigerant from the section of the refrigeration circuit.

6. The method of claim 5, further comprising directing refrigerant through the first flow path during operation in a cooling mode, and directing refrigerant through the second flow path during operation in a heating mode.

7. The method of claim 5, wherein the section of the refrigeration circuit includes the condenser.

8. The method of claim 5, wherein the refrigeration circuit includes a receiver tank, and wherein recovering refrigerant from the section of the refrigeration circuit during operation in the recovery cycle includes directing refrigerant through the first flow path to increase the pressure in the receiver tank.

9. The method of claim 5, wherein recovering refrigerant from the section of the refrigeration circuit during operation in the recovery cycle includes interrupting the flow of refrigerant through the second flow path and directing refrigerant through the first flow path.

10. A method of operating a temperature control unit, the temperature control unit including a refrigeration circuit enclosing a refrigerant and including a compressor, a condenser, and an evaporator coil, the method comprising:
    providing a first flow path extending through the compressor, the condenser, and the evaporator;
    providing a second flow path extending through the compressor and the evaporator, the second flow path bypassing a section of the refrigeration circuit;
    directing refrigerant through the first flow path during operation in a cooling directing refrigerant through the second flow path during operation in a heating mode; and
    interrupting the heating mode and removing refrigerant from the section of the refrigeration circuit;
    wherein the temperature control unit defines an air inlet and an air outlet and the method further comprises:
    providing an efficiency range;
    measuring an air inlet temperature;
    measuring an air outlet temperature; and
    calculating a temperature change between the air inlet temperature and the air outlet temperature; and
    wherein interrupting the heating mode and removing refrigerant from the section of the refrigeration circuit includes removing refrigerant from the section of the refrigeration circuit when the temperature change is outside the efficiency range.

11. The method of claim 10, wherein removing refrigerant from the section of the refrigeration circuit includes directing refrigerant through the first flow path.

12. The method of claim 10, wherein the refrigeration circuit includes a receiver tank, and wherein removing refrigerant from the section of the refrigeration circuit includes directing refrigerant through the first flow path to increase pressure in the receiver tank.

13. A temperature control unit comprising:
    a refrigeration circuit having a refrigerant and including a compressor, a condenser, an evaporator coil, and a valve;
    a first flow path extending through the compressor, the condenser, the evaporator, and the valve;
    a second flow path extending through the compressor, the evaporator, and the valve, the second flow path bypassing a section of the refrigeration circuit, the valve having a first orientation, in which refrigerant is directed along the first flow path, and a second orientation, in which refrigerant is directed along the second flow path;
    a controller in communication with the valve and operable to move the valve between the first orientation and the second orientation, the controller moving the valve toward the first orientation to remove refrigerant from the section of the refrigeration circuit during operation in a recovery cycle;
    an air inlet and an air outlet, the evaporator coil being arranged between the air inlet and the air outlet;
    a first temperature sensor positioned adjacent to the air inlet to record an inlet temperature, the first temperature sensor being in communication with the controller; and a second temperature sensor positioned adjacent to the air outlet to record an outlet temperature, the second temperature sensor being in communication with the controller, the controller calculating a difference between the inlet temperature and the outlet temperature and initiating the recovery cycle when the difference between the inlet temperature and the outlet temperature is outside a predetermined range.

14. The temperature control apparatus of claim 13, wherein the temperature control apparatus is operable in a cooling mode and a heating mode, and wherein the controller moves the valve to the first orientation during operation in the cooling mode and moves the valve to the second orientation during operation in the heating mode.

* * * * *

UNITED STATES PATENT AND TRADEMARK OFFICE
CERTIFICATE OF CORRECTION

PATENT NO. : 6,910,341 B2
DATED : June 28, 2005
INVENTOR(S) : Panayu Robert Srichai, William Francis Mohs and Bradley Michael Ludwig It is certified that error appears in the above-identified patent and that said Letters Patent is hereby corrected as shown below:

Column 10,
Line 19, insert -- mode; -- between "cooling" and "directing".

Signed and Sealed this

Eighth Day of November, 2005

JON W. DUDAS
*Director of the United States Patent and Trademark Office*